US011624183B2

(12) United States Patent
Thomzick et al.

(10) Patent No.: US 11,624,183 B2
(45) Date of Patent: Apr. 11, 2023

(54) PROFILE BOND

(71) Applicant: Otto Fuchs Kommanditgesellschaft, Meinzerhagen (DE)

(72) Inventors: Gerd Thomzick, Marienheide (DE); Stefan Anders, Meinerzhagen (DE); Sebastian Kersten, Meinerzhagen (DE)

(73) Assignee: OTTO FUCHS KOMMANDITGESELLSCHAFT, Meinzerhagen (DE)

( * ) Notice: Subject to any disclaimer, the term of this patent is extended or adjusted under 35 U.S.C. 154(b) by 224 days.

(21) Appl. No.: 16/817,486

(22) Filed: Mar. 12, 2020

(65) Prior Publication Data

US 2020/0299952 A1 Sep. 24, 2020

(30) Foreign Application Priority Data

Mar. 20, 2019 (DE) ...................... 20 2019 101 580.2

(51) Int. Cl.
 *E04B 1/38* (2006.01)
 *E04C 2/38* (2006.01)
 (Continued)

(52) U.S. Cl.
 CPC ................ *E04B 1/38* (2013.01); *E04C 2/384* (2013.01); *F16B 5/0096* (2013.01); *F16B 5/07* (2013.01)

(58) Field of Classification Search
 CPC . E04B 1/38; E04C 2/384; Y02T 10/70; F16B 5/0096; F16B 5/07; F16B 5/0012; F16B 5/0016
 (Continued)

(56) References Cited

U.S. PATENT DOCUMENTS 2,121,638 A * 6/1938 Lemmers ................ F16K 15/20
  313/42
3,440,696 A * 4/1969 Staller ...................... B29D 5/10
  24/586.1
(Continued)

FOREIGN PATENT DOCUMENTS

DE 7112240 U 6/1971
DE 2510211 A1 9/1976
(Continued)

OTHER PUBLICATIONS

European Search Report dated Aug. 13, 2020 in related application EP 20162129.9.

*Primary Examiner* — Sarang Afzali
*Assistant Examiner* — Darrell C Ford
(74) *Attorney, Agent, or Firm* — Polson Intellectual Property Law, PC; Christopher Sylvain; Margaret Polson

(57) ABSTRACT

A profile assembly produced from a first profile and a second profile connected longitudinally by cold joining. Both profiles bear complementary clamping structures on long sides thereof facing toward one another for cold joining together. The clamping structure of the first profile comprises a clamping head formed on a web and forming an undercut on each side of the web by way of a greater extension in the profile transverse direction in relation to that of the web. The clamping structure of the second profile comprises a clamping head receptacle for accommodating a section of the clamping head and a clinching leg, formed on a profile-exterior leg of the clamping head receptacle, having a first profile arm protruding before cold joining and a second profile arm formed at an angle thereon, the free end of which engages behind the clamping head and, before cold joining, faces toward a clamping pocket of the first profile. The clamping head receptacle is tapered with respect to its open width and/or the clamping head is tapered with respect to its
(Continued)

material thickness of the section to be inserted into the clamping head receptacle, wherein the section of the clamping head pressed into the clamping head receptacle is connected to the clamping head receptacle in a metallically sealed manner.

17 Claims, 4 Drawing Sheets

(51) Int. Cl.
*F16B 5/07* (2006.01)
*F16B 5/00* (2006.01)

(58) Field of Classification Search
USPC .......................................................... 403/97
See application file for complete search history.

(56) References Cited

U.S. PATENT DOCUMENTS

| | | | | | |
|---|---|---|---|---|---|
| 3,477,350 | A * | 11/1969 | Glaza | ............... | B62D 33/023 404/41 |
| 3,669,477 | A * | 6/1972 | Ulich | ............... | F16D 1/08 403/372 |
| 4,147,007 | A * | 4/1979 | Eppich | ............... | F16B 5/07 446/114 |
| 4,213,257 | A * | 7/1980 | Johansson | ............... | E02F 9/2841 299/109 |
| 4,447,171 | A * | 5/1984 | Baldoni | ............... | F16B 5/0692 403/381 |
| 4,664,551 | A * | 5/1987 | Poitier | ............... | B60H 1/00528 403/335 |
| 4,769,963 | A * | 9/1988 | Meyerson | ............... | E04B 1/80 52/309.9 |
| 4,814,071 | A * | 3/1989 | Lower | ............... | B07B 1/46 193/25 E |
| 4,841,603 | A * | 6/1989 | Ragni | ............... | A44B 19/16 206/522 |
| 5,134,250 | A * | 7/1992 | Caveney | ............... | H02G 3/0418 138/162 |
| 5,201,597 | A * | 4/1993 | Wurl | ............... | F16B 9/07 29/522.1 |
| 5,410,855 | A * | 5/1995 | Clausen | ............... | E04C 2/08 52/747.1 |
| 6,279,648 | B1 * | 8/2001 | Diels | ............... | H01L 21/4882 257/E23.102 |
| 6,334,642 | B1 * | 1/2002 | Waldeck | ............... | B62D 27/065 296/193.03 |
| 6,739,106 | B2 * | 5/2004 | Curatolo | ............... | E04F 15/10 52/105 |
| 6,880,305 | B2 * | 4/2005 | Pervan | ............... | B23P 11/00 52/480 |
| 7,036,203 | B2 * | 5/2006 | Rudduck | ............... | B62D 23/005 29/469 |
| 7,047,697 | B1 * | 5/2006 | Heath | ............... | E04F 15/10 52/177 |
| 7,845,140 | B2 * | 12/2010 | Pervan | ............... | E04F 15/02 428/44 |
| 10,451,200 | B2 * | 10/2019 | Morton | ............... | F16L 9/22 |
| 10,677,275 | B1 * | 6/2020 | Caselli | ............... | E04B 1/82 |
| 2004/0211144 | A1 * | 10/2004 | Stanchfield | ............... | E04F 13/076 52/311.1 |
| 2008/0134613 | A1 * | 6/2008 | Pervan | ............... | E04B 5/00 52/582.2 |
| 2009/0041987 | A1 * | 2/2009 | Schitter | ............... | B32B 9/06 428/172 |
| 2009/0100782 | A1 * | 4/2009 | Groeke | ............... | E04F 15/02 52/309.3 |
| 2009/0211852 | A1 * | 8/2009 | Hannon | ............... | A44B 19/16 24/415 |
| 2010/0018149 | A1 * | 1/2010 | Thiers | ............... | E04F 15/02033 52/588.1 |
| 2011/0179735 | A1 * | 7/2011 | Paetrow | ............... | E04F 13/0889 52/309.1 |
| 2011/0296780 | A1 * | 12/2011 | Windmoller | ............... | B32B 27/20 52/309.1 |
| 2011/0318094 | A1 * | 12/2011 | Hensley | ............... | E06B 3/277 403/291 |
| 2014/0120407 | A1 * | 5/2014 | Hofer | ............... | H01M 50/502 429/159 |
| 2017/0325552 | A1 * | 11/2017 | Bronson | ............... | A44B 18/0065 |
| 2021/0054860 | A1 * | 2/2021 | Thomzick | ............... | E04C 2/38 |

FOREIGN PATENT DOCUMENTS

| | | |
|---|---|---|
| DE | 3806091 A1 | 9/1989 |
| DE | 29508974 U1 | 8/1995 |
| DE | 202005008016 U1 | 8/2005 |
| DE | 102016213832 A1 | 2/2018 |

* cited by examiner

PROFILE BOND

RELATED APPLICATIONS

This application claims priority to German application number DE 20 2019 101 580.2 filed Mar. 20, 2019, which is incorporated by reference herein.

BACKGROUND

The present disclosure relates to a profile bond, composite or assembly produced from a first metal profile and a second metal profile longitudinally connected to the first profile by cold joining, which two profiles bear complementary clamping structures on the long sides thereof facing toward one another for cold joining of the two profiles, wherein the first profile comprises as a clamping structure a clamping head formed on a web and forming an undercut in each case by greater extension in the profile transverse direction in relation to that of the web on both sides of the web, and the clamping structure complementary thereto of the second profile comprising a clamping head receptacle for accommodating a section of the clamping head of the first profile and a clinching leg formed on a leg of the clamping head receptacle and having a first profile arm protruding before the cold joining and a second profile arm formed at an angle thereon, the free end of which is provided for engaging behind the clamping head and comprises a clamping pocket of the first profile delimited by the web before the cold joining connection.

A profile composite produced from a first metal profile and a second metal profile longitudinally connected thereto by cold joining is known from DE 20 2005 008 016 U1. In this previously known profile composite, two profiles are longitudinally connected to one another in the direction of the longitudinal extension of the profile in a formfitting manner in the plane of the profile composite. The hooking effectuated by the hook projections of the two hook strips to be engaged with one another faces in the opposite direction in each case, so that the two hook strips can be engaged with one another like claws using the hook projections thereof and can be engaged in this manner in the produced profile composite. In this manner, the two profiles are connected to one another in a formfitting manner in the profile plane transversely to the longitudinal extension thereof. The hook projection of the hook strip of the first profile is provided by an anchoring channel, into which the hook projection of the hook strip of the second profile is bent by way of a cold joining process to engage in the undercut provided by the anchoring channel. In this previously known profile composite, a positioning strip is formed on the hook strip of the second profile. The positioning strip is formed on the rear side on the hook strip with respect to the hook projection. Before production of the profile composite, this positioning strip is located in a position such that by way of a force application transversely to the height of the profiles, it can be pressed together with the hook projection into the undercut of the anchoring channel of the first profile. The positioning strip itself is supported in the produced profile composite on a side wall of the anchoring channel opposite to the hook projection in order to fix the positioning strip at this point following its longitudinal extension. Therefore, in this prior art the positioning strip also represents the clamping strip of the profile composite.

In this previously known profile composite, the hook projection of the hook strip on which the positioning strip is formed engages in the undercut of the anchoring channel of the first profile. The hook projection is not supported thereon inside the anchoring channel. The buttress for the support of the positioning strip on the side wall of the anchoring channel is located on the outer side of the hook projection of the first profile. A gap remains between the outer surface of the positioning strip and the base of the anchoring channel. When water-tightness or an insulating effect is to be achieved in the profile composite, this gap can be used to introduce a filler material.

A profile composite of the type in question is known from DE 38 06 091 A1. In this profile composite, the first profile has a clamping head, formed on a web which is oriented from the profile outer side in the direction toward the profile interior, as a clamping structure. The second profile bears, as a complementary clamping structure, a clamping head receptacle, in which a section of the clamping head engages to clamp the two profiles to one another. A clinching leg, which protrudes inward from the profile plane before the cold joining, is formed in extension of the profile-interior leg of the clamping head receptacle. The clamping head receptacle is then open in the transverse extension of the profile longitudinal extension, so that the clamping head of the other profile can be inserted therein. The clamping head engaging with a section in the clamping head receptacle is locked by folding over the clinching leg, the free end of which engages in a pocket formed by the clamping head and the web. By reshaping the clinching leg, a permanent connection between the two profiles and thus the desired profile composite is produced.

To produce this previously known profile composite, it is necessary for the clamping structures, which are to be reshaped to produce the profile composite, to be arranged on the profile inner side. This is also performed against the background that the outer side of the profile composite has to be planar. This is not problematic in the case of single-belt profiles. In many cases, however, such a profile is a hollow chamber profile. An access to a positioning strip in the case of a profile composite according to DE 20 2005 008 016 U1 or a clinching leg in the case of DE 38 06 091 A1 is then obstructed. In such a case, a mandrel is used, which is drawn through the hollow chamber to produce the cold joined connection between two profiles.

Although such a profile composite has proven itself over years, it would be desirable to improve it in such a way that the profile composite is not only water-tight and gas-tight without having to introduce an additional sealant material into the profile composite, but rather the production of the profile composite is also capable of being simplified in that the cold joined connection is also possible in spite of the desired planar outer side of the profile composite upon a connection of two hollow chamber profiles.

An aspect of the present disclosure is thus based on providing such a profile bond, composite or assembly.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

The above aspect of the present disclosure is achieved by a profile bond, composite or assembly of the type in question mentioned at the outset, in which the clinching leg is formed on the profile-exterior leg of the clamping head receptacle and in which the clamping head receptacle is tapered with respect to the design of its open width and/or the clamping head is tapered with respect to the material thickness of the section to be inserted into the clamping head receptacle in the direction toward the bottom of the clamping head receptacle, wherein the section of the clamping head pressed into the clamping head receptacle of the second profile is connected metallically sealed to the clamping head receptacle in the profile transverse direction at least in regions by way of the second profile arm in the course of the cold joining connection.

In this profile composite, for the production thereof, the second profile has a clamping head receptacle, the profile-exterior leg of which forming the outer side of this profile merges into a clinching leg. The clinching leg is arranged protruding from the profile outer side before the cold joining. The clinching leg has a first profile arm. This arm is formed on the profile-exterior leg of the profile. In addition to the first profile arm, the clinching leg has a second profile arm formed at an angle on the first profile arm, the free end of which faces in the direction of a clamping pocket of the first profile before the cold joining procedure. The clamping pocket is provided by a web bearing the clamping head and a section of the clamping head of the first profile. The center longitudinal plane of the second profile arm is inclined in relation to the plane of the profile outer side, specifically in the direction toward the bottom of the clamping pocket. The clinching leg is embodied to be essentially V-shaped in cross section because of the inclination of the two profile arms in relation to one another. The two profile arms are typically connected to one another by a connecting section embodied to be curved. The clamping pocket of the first profile open toward the free end of the second profile arm of the clinching leg has a wall geometry opposite to the clamping head, so that the profile arm is adjusted and/or elastically reshaped in the direction toward the bottom of the clamping pocket and thus in the direction toward the second profile by the procedure of cold joining. This adjustment movement is accompanied by a pre-tension acting on the bottom of the clamping pocket, by which the section of the clamping head facing toward the second profile is pressed into the clamping head receptacle. Due to this pressing in of the section of the clamping head of the first profile engaging in the clamping head receptacle of the second profile, the desired seal is provided between the clamping head and the clamping head receptacle by the two metal surfaces, which act on one another as a result of the surface pressure. A cold pressure welded bond typically results between the clamping head and the inner wall of the clamping head receptacle. The surface regions of the clamping head receptacle and the clamping head interacting to form the metallic seal are designed for this purpose in such a way that as a result of the cold joining process, a surface pressure prevails between the two parts such that a metallic seal is formed. As a result, such a profile composite is gas-tight without additional filler or sealant material.

In this profile composite, the provision of a planar profile outer side is possible and typically also provided, although the leg to be reshaped for the profile composite is located on the outer side. This is possible in this profile composite since the clamping pocket is located in the transverse direction of the first profile between the clamping head and the belt on which the web bearing the clamping head is formed. In other words: the clamping pocket is located between the belt of the first profile forming the profile outer side and the clamping head protruding beyond the actual belt in transverse extension of the first profile. The clamping head of the first profile is thus undercut on both sides from the viewing direction of the profile outer side, wherein the undercut forms the clamping pocket in the direction toward the belt of the first profile. The clinching leg forming the profile outer side of the second profile can thus be laid around the clamping head of the first profile and can press it into its clamping head receptacle in the course of the cold joining method.

In the scope of these statements, the profile outer side is to be considered the side of the profile or the profile composite produced therefrom which is embodied as planar. The other profile side is then the profile inner side.

For the purposes of forming a metallic seal between the clamping head and the clamping head receptacle, two contact surface regions opposite to one another with respect to a part of the clamping head engaging in the clamping head receptacle are provided to form a metallic seal in each case in the profile composite, specifically between the side facing toward the profile outer side of the section of the clamping head extending into the clamping head receptacle and its side facing toward the profile inner side, each with the opposing wall of the clamping head receptacle. For this purpose, either the open width of the clamping head receptacle is tapered in the direction toward its bottom and/or the clamping head is tapered in the direction toward its vertex facing into the clamping head receptacle. Preferably, both the open width of the clamping head receptacle and also the clamping head are tapered. In one design of such a profile composite, the tapering angles of the open width of the clamping head receptacle and that of the clamping head toward its vertex are equal. In such a design of the complementary clamping structures, not only do two metallic seal regions result as a consequence of the cold joining pressing procedure. But also, the extension of the sealing surface viewed in the profile transverse direction is then relatively large. In order to apply the surface pressure required for the metallic seal using the available forces, the structure elements interacting in this regard will be adapted to one another. In the case of a lesser extension of the metallic sealing surfaces in the profile transverse direction, a greater force concentration is possible, with a correspondingly higher surface pressure.

To achieve the maximum surface pressure on the two contact surface regions, which are spaced apart from one another in the transverse direction to the movement direction of the clamping head into the clamping head receptacle, these two clamping structure parts are adapted to one another in such a way that after the cold joining procedure, the vertex of the clamping head is spaced apart from the bottom of the clamping head receptacle. The entire movement amount, by which the clamping head is pressed into the clamping head receptacle by the procedure of cold joining, then goes into the desired surface pressure. A force conversion in the transverse direction to the pressing-in direction of the clamping head into the clamping head receptacle is thus caused by the taper.

Due to the reshaping of the clinching leg during the process of the cold joining, the reshaping force is provided to the above-described movement of the clamping head into the clamping head receptacle of the second profile. For this reason, in one preferred design, the open width of the clamping pocket is greater than the material thickness of the second profile arm of the clinching leg introduced therein. The vertex of the second profile arm is supported on the bottom of the clamping pocket. The angle of inclination of the center longitudinal plane of the second profile arm of the clinching leg in relation to the profile plane is reduced by the cold joining. The vectorial movement component, using which the clamping head is pressed into the clamping head receptacle, results from this movement. After the cold joining, the second profile arm of the clinching leg is located inside the clamping pocket and thus engages behind the clamping head on its side opposite to the clamping head receptacle when viewed in the profile transverse direction. The two profiles are engaged with one another in a claw-like manner by this arrangement in this region of the two clamping structures engaged with one another, wherein a support in the profile transverse direction is only provided, however, between the vertex of the second profile arm and the bottom of the clamping pocket.

After the cold joining, the first profile arm of the clinching leg is located in the profile plane. Two profiles forming a profile composite in this manner can therefore comprise one outer side located in a common plane. It is moreover advantageous that tensions acting on the profile composite do not result in a deformation of the first profile arm in its spatial position in relation to the components of the second profile adjoining thereon. Weakening of the profile composite by applied tensile loads is effectively prevented in this way. Due to the procedure of reshaping, the reshaped sections of the clinching leg are moreover typically cold hardened at least somewhat. This also effectively counteracts bending over in the reshaping zones. While the vertex region between the first profile arm and the second profile arm of the clinching leg represents a first reshaping region, a second reshaping region is located between the clinching leg and the components of the second profile adjoining thereon. This bending zone is defined according to one embodiment by a wedge groove, which is arranged on the inner side and follows the longitudinal extension of the profile. This groove is located in the transition region from the clinching leg into the adjoining components of the second profile.

If an additional formfitting fixation of the clinching leg of the second profile engaging in the clamping pocket of the first profile is desired, a locking bead may be formed on the exterior orifice of the clamping pocket of the first profile on the side opposite to the clamping head. This bead protrudes from the outer side of this profile before the cold joining connection is carried out. This bead is preferably inclined somewhat in the direction toward the clamping head. The bead protrudes with a lesser height from the first profile than the clinching leg of the second profile when it is hung in the orifice of the clamping pocket to carry out the cold joining connection. In the course of the cold joining, during which the joining force is applied perpendicularly to the plane of the outer sides of the two profiles, the clinching leg is pressed with its front profile arm into the clamping pocket. In the same procedure, the locking bead is subsequently reshaped acting against the outer side of the clamping leg, whereby an undercut is formed, in which the clinching leg engages. The reshaped locking bead acts against the outer side of the clinching leg, so that in this manner the engagement of the clinching leg in the clamping pocket is moreover secured in a formfitting manner.

The above-described profile composite is suitable for connecting two individual profiles each having only one belt, and also for connecting profiles having an upper belt and a lower belt. The clamping structures are located at the end of such a belt, typically in the plane thereof. Multiple or also a plurality of individual such profiles can thus be assembled to form a profile composite, wherein respective profiles adjacent to one another form the first and second profile of the profile composite described above on the basis of only two profiles.

A special advantage which results from the option of exterior joining, i.e., the application of the force required for the cold joining from the outside, is that inwardly protruding webs and the like do not obstructively stand in the way of a reshaping tool acting on the outer side. It is also advantageous that profiles having a lower belt and an upper belt which are connected to one another at the ends by a web and thus form a U-shaped receptacle can be introduced into the profile composite already equipped with one or more objects. This is possible since no internal tools are required for the cold joining pressing procedure. For this reason, the web connecting two belts is aligned with the significant force introduction of a pressing tool applied to the exterior, so that the web connecting the belts provides the buttress in relation to the reshaping force applied to the exterior. Therefore, even sensitive objects, for example battery modules for vehicles driven by electric motors, can be introduced into such a profile before its receptacle is longitudinally closed by the attachment to an adjacent profile. An insertion of objects into such a profile, for example, battery modules, can be performed in a simple manner utilizing the elastic properties of the profile in the profile transverse direction, specifically in that the two belts are elastically bent open to enlarge the receptacle opening at the ends thereof not supported on one another. Such an assembly is very much simpler than subsequent insertion of such objects through the open end face after production of the hollow profile composite. This particularly applies to objects to be housed in such a profile which have to be wired, as is generally the case as with these battery modules. The connection of an upper belt to a lower belt can also be embodied having a double web, therefore having two webs arranged at a slight distance in relation to another. In this way, a hollow chamber is provided. With such a design, the support of upper belt and lower belt is distributed over a larger engagement surface. Moreover, such a hollow chamber can be used, for example, for leading through cables or the like.

A completion profile, which is embodied without upper belt and lower belt and therefore only comprises the web connecting the clamping structures, is used solely for closing the last profile of such a profile composite assembled from multiple profiles.

In addition to the aspects and embodiments described above, further aspects and embodiments will become apparent by reference to the accompanying drawings and the detailed description forming a part of this specification.

BRIEF DESCRIPTION OF THE DRAWINGS

The present disclosure is described hereafter on the basis of example embodiments with reference to the appended figures. In the figures.

Before further explaining the depicted embodiments, it is to be understood that the present disclosure is not limited in its application to the details of the particular arrangements shown, since the present disclosure is capable of other embodiments. It is intended that the embodiments and figures disclosed herein are to be considered illustrative rather than limiting. Also, the terminology used herein is for the purposes of description and not limitation.

DETAILED DESCRIPTION

Figure 1:
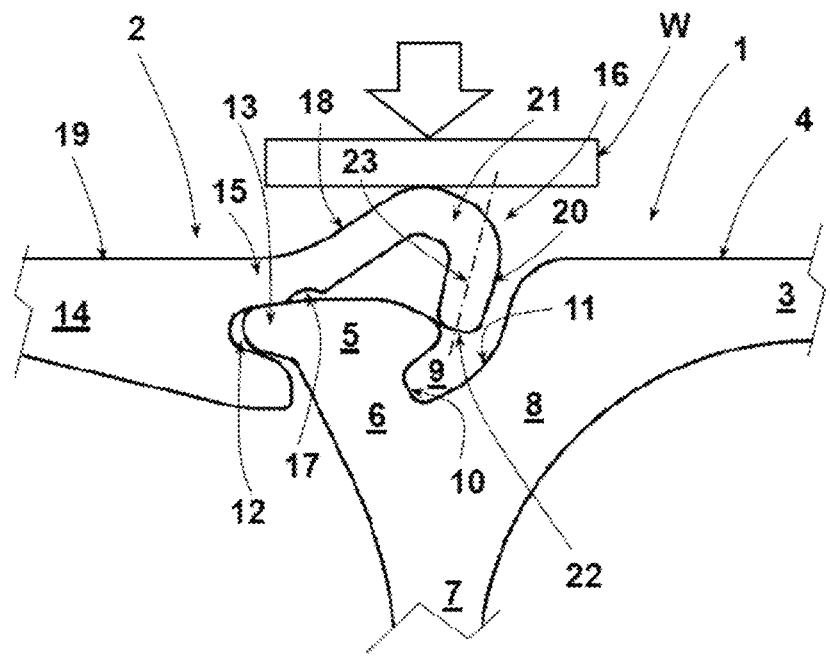
FIG. 1 shows a detail view of a profile composite to be produced from a first profile and a second profile.

The longitudinal ends of a first profile 1 and a second profile 2 facing toward one another are shown in FIG. 1. The two profiles 1, 2 are produced in the illustrated embodiment from an aluminum alloy, as is well known for such profiles to be connected by a cold joining process. The two profiles 1, 2 are extruded profiles. The first profile bears a clamping head 5 as a clamping structure in extension of its belt 3 recognizable in FIG. 1, the surface 4 of which represents the profile outer side. The clamping head 5 is formed on a web 6, which is in turn formed on a transition section 8 that connects the belt 3 to a protruding profile web 7 facing away from its surface 4. In the profile transverse direction shown in FIG. 1, the clamping head 5 protrudes beyond both sides of the web 6, so that from the viewing direction of the profile outer side, the clamping head 5 is undercut on both sides. The section of the clamping head 5 which protrudes beyond the web 6 in the direction toward the belt 3 forms a clamping pocket 9 together with the web 6 and the outer wall of the transition section 8 between belt 3 and profile web 7. In this case, the web 6 forms the bottom 10 of the clamping pocket 9. The wall at 11 provided by the transition section 8 and delimiting the clamping pocket 9 is curved in the embodiment shown in FIGS. 1 and 2. The bottom 10 of the clamping pocket 9 fundamentally faces in the direction toward the second profile 2.

The second profile 2 bears as a clamping structure a clamping head receptacle 12, in which the section 13 of the clamping head 5 facing toward the second profile 2 engages. The clamping head receptacle 12 is tapered, like the section 13 of the clamping head 5 engaging therein, in the direction toward the second profile 2 or its belt 14. The clamping head receptacle 12 is provided by a forked end section of the second profile 2. A clinching leg identified as a whole by the reference sign 16 is formed on the leg 15 of the second profile 2 on the outer side of the profile with respect to the clamping head receptacle 12. In the illustrated embodiment, a wedge groove 17 is located on the profile inner side at the transition from the leg 15 into the clinching leg 16. A bending zone is provided by this groove. The clinching leg 16 has a first profile arm 18, which is arranged protruding in relation to the leg 15 of the second profile and thus in relation to its outer side 19 before the cold joining procedure. The first profile arm merges into a second profile arm 20 via a connecting section 21, which is embodied as rounded, so that the clinching leg 16 of this embodiment is approximately V-shaped as a result of the inclination of the profile arm 20 in relation to the profile arm 18. The free end of the second profile arm 20 provided by the vertex 22 faces in the direction toward the clamping pocket 9 of the first profile 1. The center longitudinal plane of the second profile arm 20 is identified by the reference sign 23 in FIG. 1. The center longitudinal plane 23 is inclined in relation to the plane of the profile outer side formed by the surface 4, specifically in the direction toward the web 6. The angle of inclination is approximately 75-80° in the illustrated embodiment.

Figure 2:
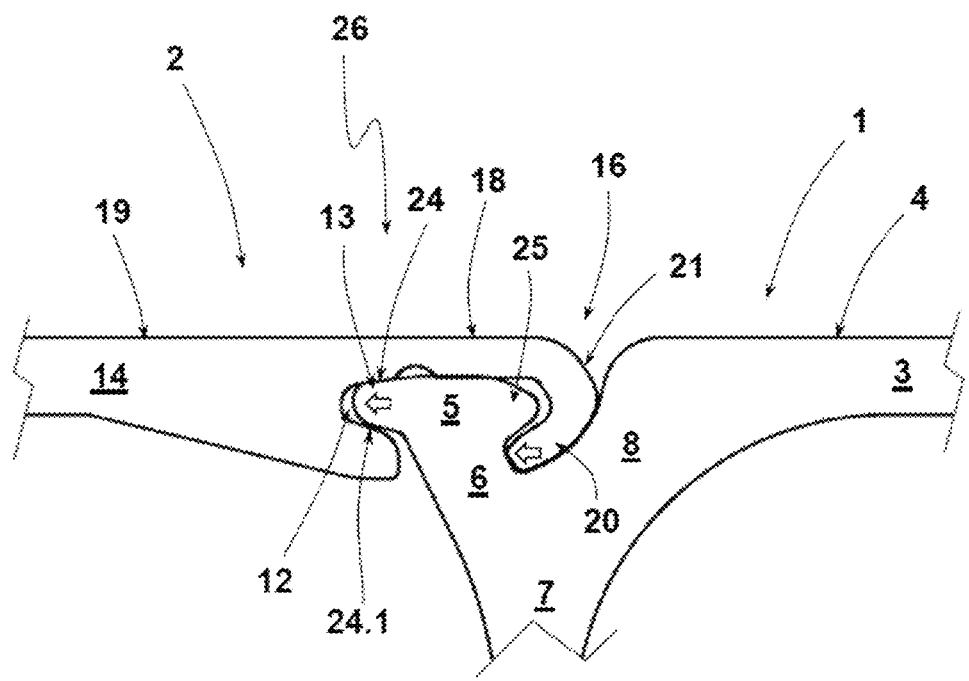
FIG. 2 shows the profile composite produced from the two profiles of FIG. 1.

FIG. 1 shows the two profiles 1, 2 in a preassembled position. To produce the profile composite, they are cold joined, specifically by a pressing method in which a reshaping force, as schematically indicated in FIG. 1 by a tool W and a block arrow, is applied to the transition section 21 of the clinching leg 16. This can be performed, for example, by means of a roller reshaping tool having one or more reshaping steps and thus having one or more rollers. A lower-side support is used as the buttress for this purpose. For the case in which the profile comprises an upper belt and a lower belt which are connected to one another by the above-described web and both belts have identical clamping structures, a second roller reshaping tool of the above-mentioned type is used as the buttress. The location of the force application is in the alignment of the profile web 7 because of the conception of the complementary clamping structures of the two profiles 1, 2. In the case of such a force application, the second profile arm 20 is pressed into the clamping pocket 9 of the first profile, wherein the transition between the first profile arm 18 and the leg 15 is plastically reshaped in the region of the wedge groove 17. If the vertex 22 of the second profile arm 20 reaches the wall 11, which is curved in the direction toward the web 6 and thus in the direction toward the bottom 10, the inclination between the two profile arms 18, 20 or the angle enclosed thereby in the connecting section 21 is also reduced by plastic reshaping. This bending zone is located in the connecting section 21 of the clinching leg 16. The vertex 22 of the second profile arm 20 is displaced by the applied joining force at the wall 11 used as the positioning surface in the direction toward the bottom 10 of the clamping pocket 9. The touch contact between the second profile arm 20 and the bottom 10 in the clamping pocket 9 results before the first profile arm 18 has been brought into the plane of the belt 14. Accordingly, the further cold joining pressing procedure, during which the first profile arm 18 is brought into the plane of the belt 14, results in a movement, which is caused by the deflection at the curved wall 11, of the vertex 22 of the second profile arm 20 in the direction toward the clamping pocket 9. The continuously applied force application results in tightening of the clamping by successive reduction of the angle enclosed by the first profile arm 18 and the second profile arm 20. A movement acting on the web 6 results therefrom, as indicated in FIG. 2 by block arrows, with which the section 13 of the clamping head 5 is pressed into the clamping head receptacle 12 of the second profile 2. Because of the above-described inclination of the contact surfaces between the clamping head receptacle 12 and the section 13 of the clamping head 12, a metallic seal results because of the high surface pressure at the contact regions. The inclination of these contact surfaces is relatively slight, so that in this way a force transmission ratio is provided to apply the desired surface pressure to achieve the metallic seal.

The profile composite 26 of the two profiles 1, 2 produced by the above-described process is shown in FIG. 2. The surface regions at which a metallic seal has formed are identified in FIG. 2 by the reference signs 24, 24.1. It can be seen clearly that the vertex of the clamping head 5 engaging in the clamping head receptacle 12 has no contact with the bottom of the clamping head receptacle 12.

In the same manner, the section 25 of the clamping head 5 forming the clamping pocket 9 is also not supported on the inner side of the reshaped connecting section 21 of the clinching leg 16. It may be seen clearly from the illustration of the profile composite of FIG. 2 that a reduction of the angle between the two profile arms 18 and 20 of the clinching leg 16 results in a force coupled into the bottom 10 of the web 6 which, as indicated in FIG. 2 by the block arrow, is oriented in the direction toward the second profile 2. This movement direction corresponds to the movement direction of the section 13 of the clamping head 5 with which it is pressed into the clamping head receptacle 12.

The profile composite 26 formed from the profiles 1 and 2 comprises an outer side located in a common plane. It is of particular significance that by way of the design of the clinching leg 16 in the profile composite 26, even a tensile stress of the profile composite 26 does not result in a negative effect thereon, therefore the metallic seal 24, 24.1 is maintained. With correspondingly high surface pressure between the vertex 22 of the second profile arm 20 and the bottom 10 of the clamping pocket 9, a metallic seal can also be formed at this point, whereby the sealing is improved once again.

The provision of a metallic seal between the two profiles 1, 2 is desirable if the profiles 1, 2 are hollow chamber profiles, the interior of which is to be sealed gas-tight in relation to the surroundings.

Figure 3:
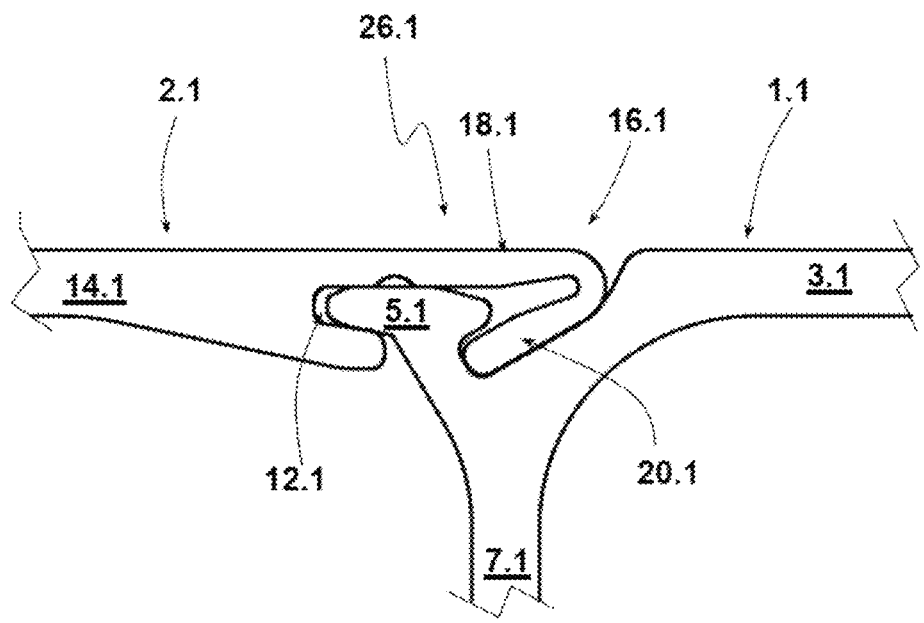
FIG. 3 shows detail view of a profile composite made of two profiles according to a further design.

FIG. 3 shows a further profile composite 26.1 having a first profile 1.1 and a second profile 2.1, which two profiles 1.1, 2.1 are identically constructed in principle as the profiles 1, 2 of the embodiment described with respect to FIGS. 1 and 2. In the profile composite 26.1, the dimensioning of the clamping leg 16.1 having its first profile arm 18.1 and its second profile arm 20.1 is dimensioned somewhat differently, as is the clamping head 5.1. The profile composite 26.1 is interconnected gas-tight and particularly durably for the same reasons as described for the profile composite 26. The statements on the profile composite 26 of FIGS. 1 and 2 therefore apply similarly to the profile composite 26.1 or its individual profiles 1.1, 2.1, respectively.

Figure 4:
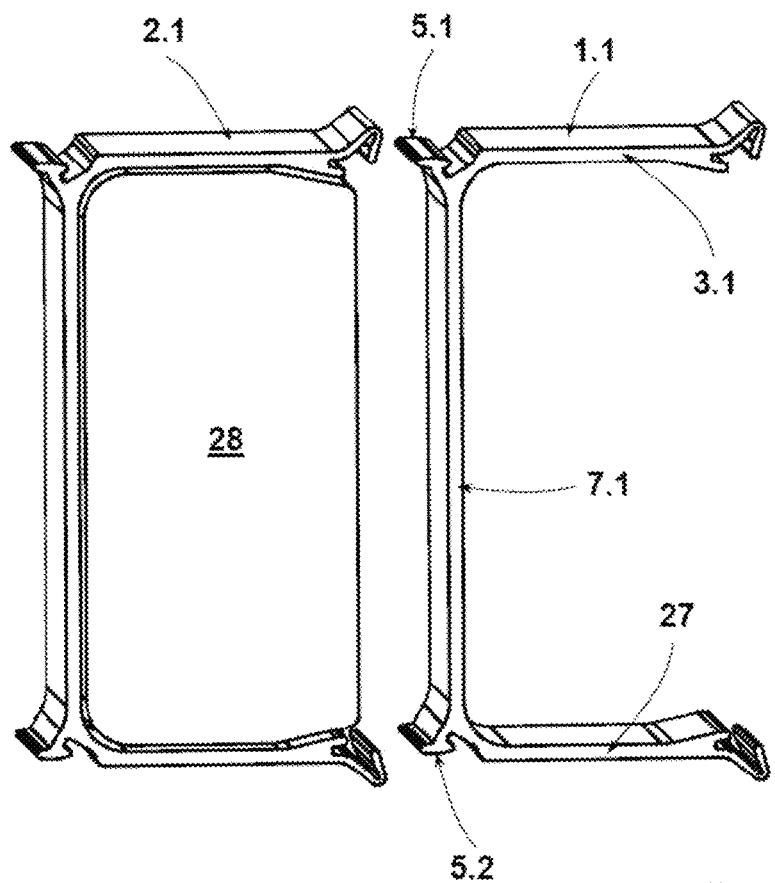
FIG. 4 shows the profiles of the profile composite shown in detail in FIG. 3 before the assembly thereof.

FIG. 4 shows the two profiles 1.1, 2.1, from which the profile composite 26.1 has been produced, in a perspective view and not only having the detail of the lateral end section of its belts 3.1, 14.1 shown in FIG. 3. The profiles 1.1, 2.1 are identical. In addition to the upper belt 3.1, they have a lower belt 27, which are connected to one another by the profile web 7.1. The lower belt 27 therefore also bears a clamping head 5.2 on its side opposite to the clamping head 5.1. At the ends opposite to the clamping heads 5.1, 5.2, the profile 1.1 bears clamping structures as described with reference to the second profile 2.1. However, the two profiles 1.1, 2.1 are only shown in a slice. The longitudinal extension thereof is substantially longer. The length is adapted to the respective intended use. The identical profiles 1.1, 2.1 are U-shaped. An object 28 is inserted into the second profile 2.1 in the U-shaped receptacle, specifically already before the second profile 2.1 has been cold joined with the first profile 1.1. In order that the object 28, which can be a battery module, for example, does not readily fall out of the opening between the two belts 3.1, 27, the object 28 follows, with respect to its outline contour, the taper of the receptacle chamber in the region of the transition from the belt 14.1 (or 3.1) into the fork to form the clamping head receptacle 12.1.

Such a preassembly of objects, for example, as with the object 28 in the profile 2.1, is already possible before the joining, since no heat and also no pressure is introduced into the profile receptacle by the joining.

Figure 5:
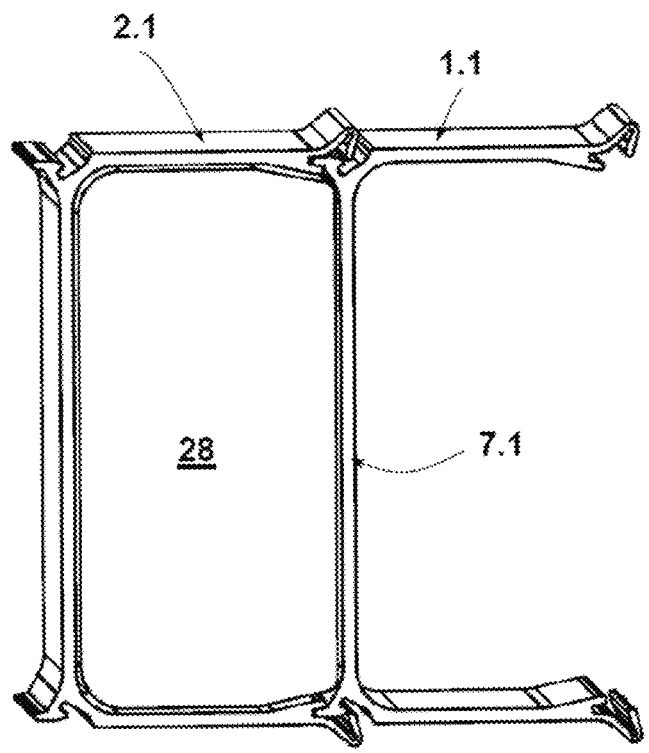
FIG. 5 shows the illustration of FIG. 4 having the profiles assembled with one another before carrying out the cold joining pressing procedure.
Figure 6:
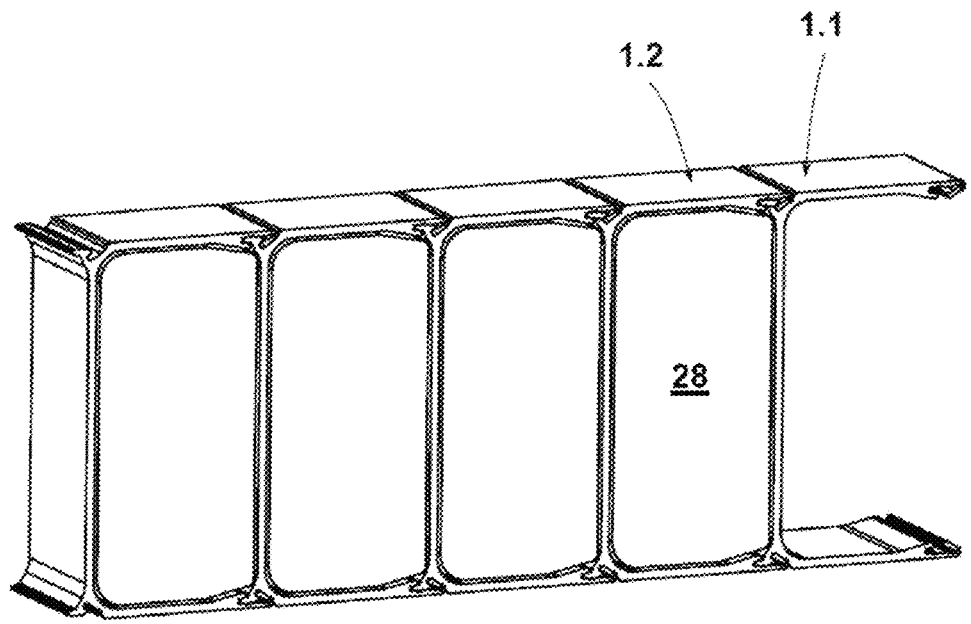
FIG. 6 shows the two profiles of FIG. 5 after carrying out the cold joining pressing procedure, wherein further identical profiles are attached to these two profiles to form a larger profile composite.

In a first step, the profiles 1.1, 2.1 are engaged with one another with respect to the clamping structures thereof, as shown in FIG. 5. This position of the two profiles in relation to one another finally corresponds to the position between the two profiles 1, 2 shown in the detail in FIG. 1. This preassembly position can be distinguished in that the second profile arm 20.1 already loosely engages behind the clamping head 5.1, so that assembly is possible utilizing the material-elastic properties and these elements do not readily fall apart again independently. The profile composite 26.1 is produced by applying a pressure force. FIG. 6 shows the two profiles 1.1, 2.1 in the profile composite, wherein further profiles of this type, already equipped with objects, can be attached in the same manner to the profile 2.1. The attachment of these further profiles 2.1 can be performed in a single joining process or in cold joining pressing procedures carried out one after another in succession.

In this manner, for example, battery enclosures, so-called battery housings for vehicles operated by electric motors, for example, can be produced. The number of the profiles to be connected to one another can be determined depending on the required battery volume.

Figure 7:
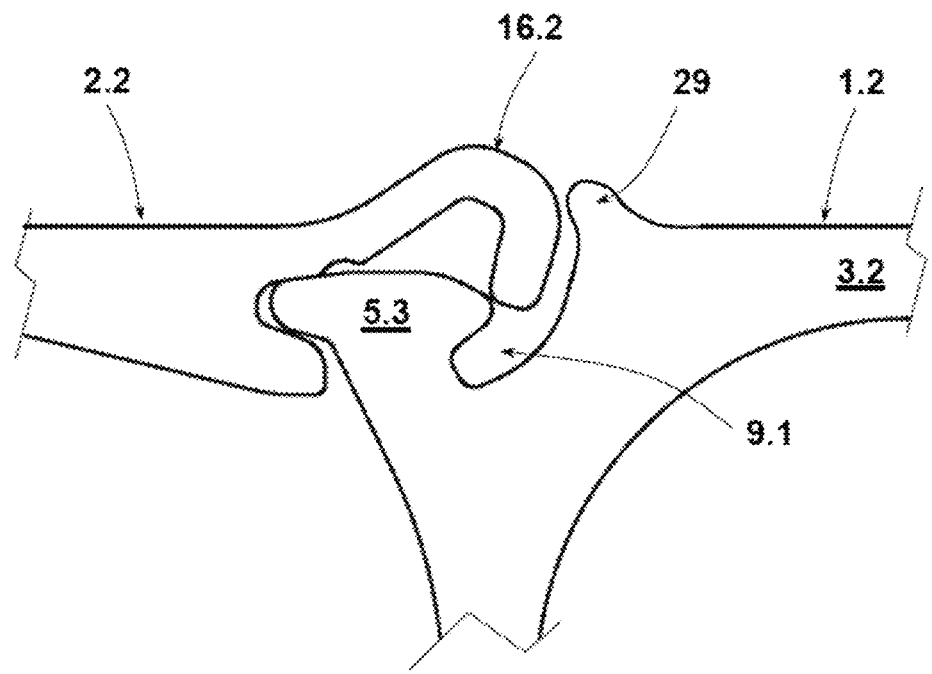
FIG. 7 shows the profiles of FIG. 1 in a modified design before carrying out the cold joining connection.

FIG. 7 shows two further profiles 1.2, 2.2, which are fundamentally constructed like the profiles 1 and 2 of the embodiment of FIGS. 1 and 2. If not described to the contrary hereafter, the statements on the profiles 1, 2 apply similarly to the profiles 1.2, 2.2 and to the production of the profile composite. The profile 2.2 is identical to the profile 2. The profile 1.2 differs from the profile 1 in that a locking bead 29 is formed on its belt 3.2 in the region of the orifice of the clamping pocket 9.1. This bead protrudes from the outer side of the profile 1.2 and is somewhat inclined in the direction toward the clamping pocket 9.1 or the clamping head 5.3. The protruding height of the locking bead 29 is less than the amount of the protrusion of the clinching leg 16.2 of the second profile 2.2 before the cold joining.

Figure 8:
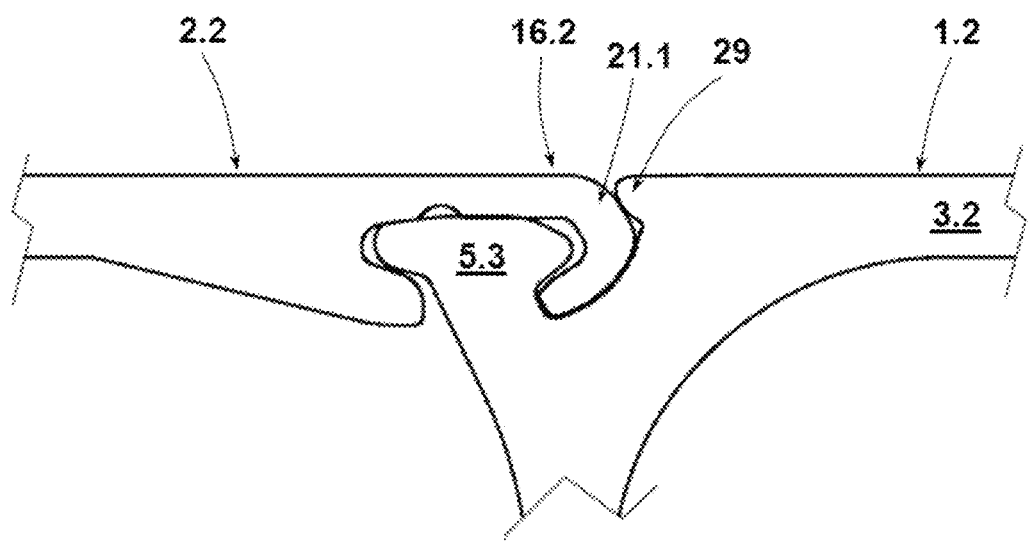
FIG. 8 shows the profile composite produced from the two profiles of FIG. 7.

The profile composite produced from the two profiles 1.2, 2.2 is shown in FIG. 8. As a result of the cold joining method, as is explained for the embodiment of FIGS. 1, 2, the clinching leg 16 has been pressed with its profile arm into the clamping pocket 9.1. The locking bead 29 has also been reshaped by the same joining procedure, so that it presses against the outer side of the clinching leg 16.2 at the completion of the cold joining process, specifically in the region of its connecting section 21.1. The locking bead 29 acts against the outer side behind the leg of the connecting section 21.1, so that the clinching leg 16.2 engages with a section in the undercut formed by the locking bead 29. The clinching leg 16.2 of the second profile 2.2 is fixed in a formfitting manner in the clamping pocket 9.1 by this measure, so that this profile composite also withstands higher bending strains.

Although multiple identical profiles are connected to one another to form a profile composite, for example, a battery enclosure, in the above-described embodiments, it is obvious that profiles of different designs can also be connected to one another in the same manner.

The invention has been described on the basis of exemplary embodiments. Without leaving the scope of the applicable claims, numerous further options result for a person skilled in the art for implementing this invention, without these options having to be described in detail in the scope of these statements. While a number of aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the present disclosure claimed. Thus, it should be understood that although the present disclosure has been specifically disclosed by preferred embodiments and optional features, modification and variation of the concepts herein disclosed may be resorted to by those skilled in the art, and that such modifications and variations are considered to be within the scope of this present disclosure as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the present disclosure.

LIST OF REFERENCE SIGNS 1, 1.1, 1.2 first profile
2, 2.1, 2.2 second profile
3, 3.1, 3.2 belt
4 surface
5, 5.1, 5.2, 5.3 clamping head
6 web
7, 7.1 profile web
8 transition section
9, 9.1 clamping pocket
10 bottom
11 wall
12, 12.1 clamping head receptacle
13 section
14, 14.1 belt
15 leg
16, 16.1, 16.2 clinching leg
17 wedge groove
18, 18.1 profile arm
19 outer side
20, 20.1 profile arm
21, 21.1 connecting section
22 vertex
23 center longitudinal plane
24, 24.1 metallic seal
25 section
26, 26.1 profile bond, composite or assembly
27 bottom belt
28 object
29 locking bead
W tool

The invention claimed is:

1. A profile assembly comprising:
a first metal profile and a second metal profile, each metal profile having a belt defining an outer side embodied planar, the first metal profile having a protruding profile web facing away from the outer side of the belt of the first metal profile,
the second metal profile being longitudinally connected to the first metal profile by cold joining, which two profiles as a part thereof have complementary clamping structures on sides thereof facing toward one another in a direction of a longitudinal extension of the profile assembly for cold joining the two profiles by deformation of at least parts of the clamping structures,
wherein the clamping structure of the first profile comprises a clamping head formed on the protruding profile web and providing an undercut on both sides of the web due to a greater extension of the clamping head in the direction of the longitudinal extension of the profile assembly in relation to that of the web, the longitudinal extension of the profile assembly being the transverse direction of the longitudinal extension of each profile,
both profiles thus providing a planar outside of the profile assembly,
wherein the clamping structure of the second profile comprises a clamping head receptacle with a profile-exterior leg for accommodating a section of the clamping head of the first profile, and a clinching leg is formed on the profile-exterior leg of the clamping head receptacle, the clinching leg having a first profile arm and a second profile arm formed on the first profile arm,
wherein the second profile arm is angled relative to the first profile arm, and a free end of the second profile arm engages behind the clamping head, with a vertex of the second profile arm being pressed due to plastic deformation of the second profile arm resulting from cold joining into a clamping pocket and against a bottom of the clamping pocket of the first profile delimited by the web, wherein a width of the clamping pocket is configured relative to a material thickness of the second profile arm of the clinching leg introduced therein such that the vertex of the second profile arm presses against the bottom of the clamping pocket,
wherein the clamping head receptacle is tapered with respect to a design of an open width of the clamping head receptacle in a direction toward a bottom of the clamping head receptacle, and the clamping head is tapered with respect to a material thickness of the section thereof inserted into the clamping head receptacle in the direction toward the bottom of the clamping head receptacle, and
wherein, as a result of cold joining of the two profiles, the section of the clamping head pressed by the second profile arm into the clamping head receptacle of the second profile is connected in a metallically sealed manner to the clamping head receptacle.

2. The profile assembly of claim 1, wherein tapering of the clamping head receptacle and/or the clamping head is embodied having a uniform taper angle.

3. The profile assembly of claim 1, wherein the material thickness of the section of the clamping head of the first profile inserted into the clamping head receptacle of the second profile is configured such that a vertex of the clamping head is spaced apart from the bottom of the clamping head receptacle.

4. The profile assembly of claim 1, wherein a wall of the first profile delimiting the clamping pocket opposite the clamping head is embodied as a positioning surface for introducing the second profile arm into the clamping pocket during cold joining of the two profiles.

5. The profile assembly of claim 1, wherein a maximum extension of the clamping head along the longitudinal extension of the profile assembly is located in a plane which continues through belts of the two profiles.

6. The profile assembly of claim 1, wherein a center longitudinal plane of the second profile arm of the clinching leg is inclined in relation to a plane of an outer side of the profile assembly in a direction toward the web of the first profile.

7. The profile assembly of claim 1, wherein a locking bead is arranged protruding from an outer side of the first profile on a side of the clamping pocket opposite to the clamping head, and the locking bead acts against an outer side of the clinching leg forming an undercut in which the clinching leg engages.

8. The profile assembly of claim 1, wherein both of the two profiles each bear the first clamping structure on one long side thereof and the second clamping structure complementary to the first clamping structure on the opposing long side thereof.

9. The profile assembly of claim 8, wherein the two profiles each comprise an upper belt and a lower belt, and both the upper and lower belts each bear a clamping structure at an end thereof.

10. The profile assembly of claim 9, wherein the two belts are only connected to one another by a profile web or a double web in a region of the ends of the belts bearing the clamping heads.

11. The profile assembly of claim 10, wherein a U-shaped receptacle of the second profile is closed by the profile web of the first profile in the profile assembly, and the U-shaped receptacle of the second profile accommodates at least one object therein.

12. The profile assembly of claim 11, wherein the object is clamped between the two belts of the second profile with clamping forces acting on the object from the two belts.

13. The profile assembly of claim 10, wherein multiple profiles connected to one another form a battery housing for accommodating battery modules.

14. The profile assembly of claim 11, wherein multiple profiles connected to one another form a battery housing for accommodating battery modules.

15. The profile assembly of claim 12, wherein multiple profiles connected to one another form a battery housing for accommodating battery modules.

16. The profile assembly of claim 1, wherein the first profile arm and the second profile arm are angled with respect to one another to be V-shaped in cross section.

17. The profile assembly of claim 16, wherein the first profile arm merges into the second profile arm via a curved connecting section.

* * * * *